(12) United States Patent
Landwehr

(10) Patent No.: US 10,753,509 B2
(45) Date of Patent: Aug. 25, 2020

(54) CONTROLLING BUOYANCY WHEN TOWING, LOWERING AND RAISING SUBMERGED STRUCTURES

(71) Applicant: Acergy France SAS, Suresnes (FR)

(72) Inventor: Marcel Marco Landwehr, Houston, TX (US)

(73) Assignee: Acergy France SAS, Suresnes (FR)

( * ) Notice: Subject to any disclaimer, the term of this patent is extended or adjusted under 35 U.S.C. 154(b) by 0 days.

(21) Appl. No.: 16/474,902

(22) PCT Filed: Dec. 22, 2017

(86) PCT No.: PCT/IB2017/001726
§ 371 (c)(1),
(2) Date: Jun. 28, 2019

(87) PCT Pub. No.: WO2018/122611
PCT Pub. Date: Jul. 5, 2018

(65) Prior Publication Data
US 2019/0346068 A1 Nov. 14, 2019

(30) Foreign Application Priority Data
Dec. 29, 2016 (GB) .................................. 1622372.9

(51) Int. Cl.
| B63B 21/26 | (2006.01) |
| F16L 1/16 | (2006.01) |
| F16L 1/24 | (2006.01) |
| B63B 21/66 | (2006.01) |
| B63C 7/12 | (2006.01) |

(52) U.S. Cl.
CPC ................ F16L 1/24 (2013.01); B63B 21/66 (2013.01); B63C 7/12 (2013.01); F16L 1/163 (2013.01); B63B 2205/06 (2013.01); B63C 2007/125 (2013.01)

(58) Field of Classification Search
CPC ... F16L 1/163; F16L 1/24; F16L 1/235; B63B 21/66; B63C 7/12
See application file for complete search history.

(56) References Cited

U.S. PATENT DOCUMENTS

| 2,731,800 A | 1/1956 | Collins |
| 3,214,921 A * | 11/1965 | Goepfert ................. F16L 1/163 |
| | | 405/168.3 |

(Continued)

FOREIGN PATENT DOCUMENTS

| CN | 101648650 | 2/2010 |
| EP | 0 264 767 | 4/1988 |

(Continued)

Primary Examiner — Benjamin F Fiorello
(74) Attorney, Agent, or Firm — Levy & Grandinetti

(57) ABSTRACT

A subsea structure has an elongate articulated buoyancy string having a longitudinal series of buoyancy elements, and at least one elongate buoyancy holder that is fixed relative to the structure and is capable of housing the buoyancy string. The buoyancy of the structure can be altered by moving the buoyancy string along a transit path that extends along and within the buoyancy holder and through an end opening of the buoyancy holder. The buoyancy string passes through that end opening on being inserted into or withdrawn from the buoyancy holder.

29 Claims, 6 Drawing Sheets

(56) References Cited

U.S. PATENT DOCUMENTS

| | | | | |
|---|---|---|---|---|
| 3,566,609 | A | * | 3/1971 | Smith ................ B63B 35/03 |
| | | | | 405/167 |
| 3,756,034 | A | | 9/1973 | Lochridge et al. |
| 3,835,707 | A | * | 9/1974 | Rosa ................ F16L 1/235 |
| | | | | 73/291 |
| 4,135,844 | A | * | 1/1979 | Lamy ................ F16L 1/163 |
| | | | | 405/171 |
| 4,138,853 | A | * | 2/1979 | Lamy ................ F16L 1/14 |
| | | | | 405/171 |
| 4,145,909 | A | * | 3/1979 | Daughtry ............ F16L 1/16 |
| | | | | 405/168.1 |
| 4,363,566 | A | | 12/1982 | Morton |
| 4,941,774 | A | * | 7/1990 | Harmstorf ........ G02B 6/4464 |
| | | | | 405/158 |
| 5,575,590 | A | * | 11/1996 | Drost ................ F16L 1/163 |
| | | | | 405/166 |

FOREIGN PATENT DOCUMENTS

| | | |
|---|---|---|
| FR | 2 260 051 | 8/1975 |
| GB | 2 377 001 | 12/2002 |
| GB | 2 377 002 | 12/2002 |
| GB | 2 408 088 | 5/2005 |
| NI | 1012926 | 3/2001 |
| NL | 7805984 | 12/1979 |
| WO | WO 2015199549 | 12/2015 |
| WO | WO 2016001680 | 1/2016 |

* cited by examiner

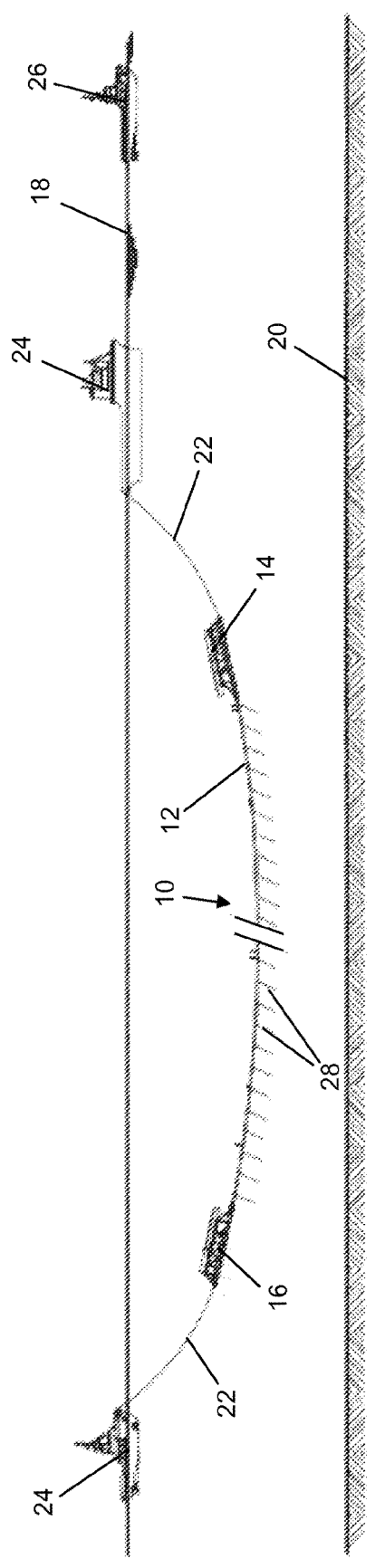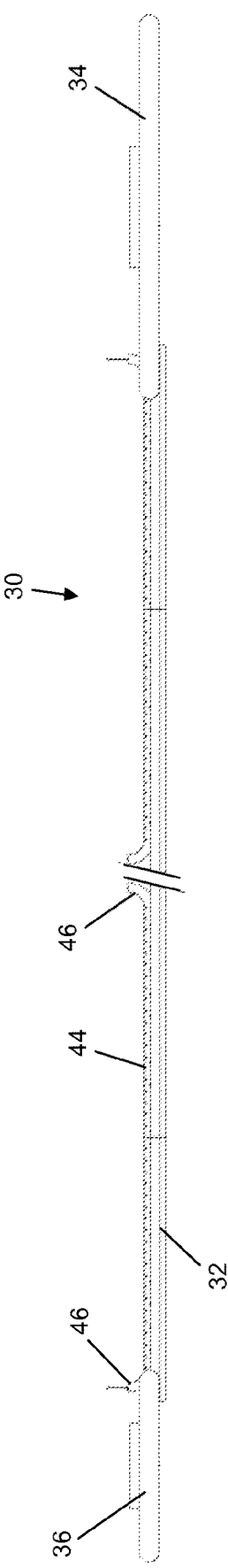
Figure 1
PRIOR ART
Figure 2

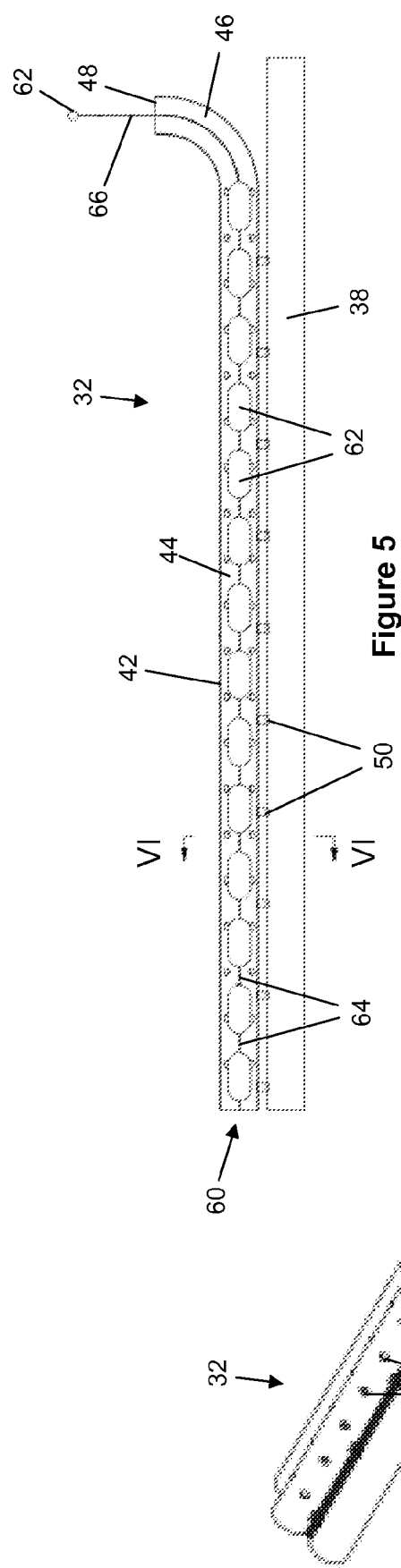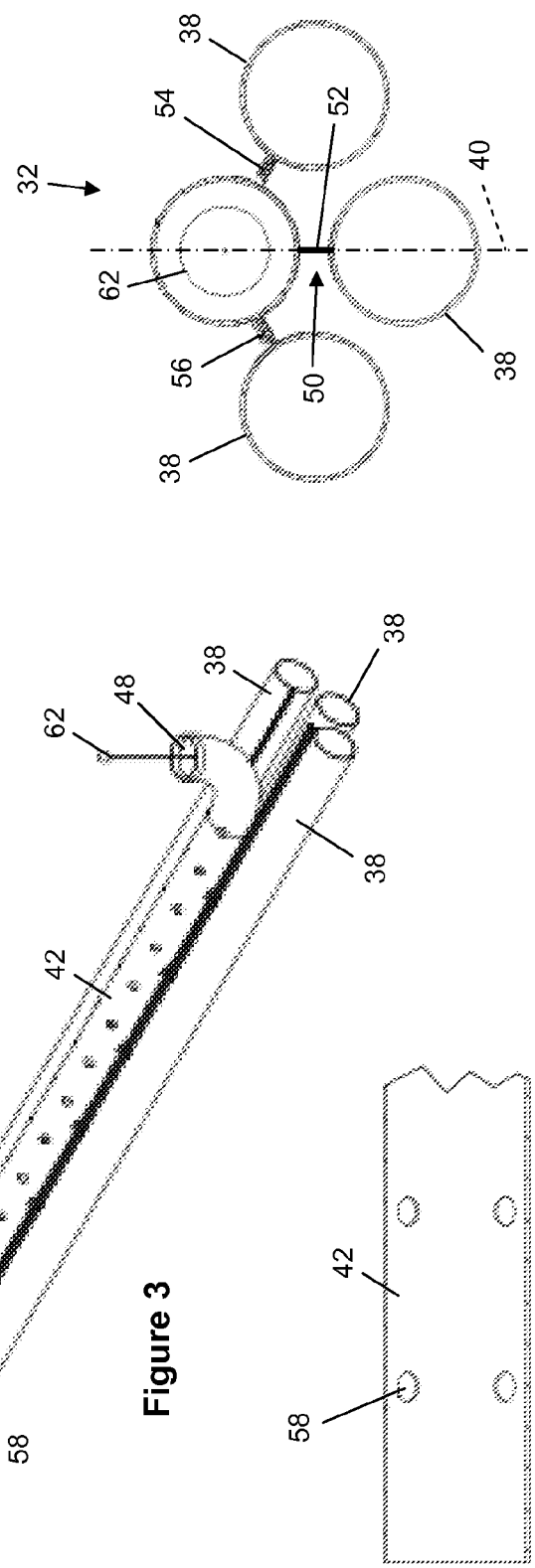

CONTROLLING BUOYANCY WHEN TOWING, LOWERING AND RAISING SUBMERGED STRUCTURES

This invention relates to controlling the buoyancy of large submerged structures, especially elongate towable structures such as pipeline bundles. The buoyancy of such long and heavy structures must be controlled when towing them to an installation site, when lowering them to form part of a subsea installation and when raising them to remove them from a subsea installation after use.

Pipeline bundles may be used in the subsea oil and gas industry to provide robust and easily-installed subsea flowline systems where the water is shallow enough to allow installation. For example, pipeline bundles may be installed in oil fields to connect or 'tie back' production subsea wells, manifolds or well head platforms to host facilities or to subsea tie-in points.

A typical pipeline bundle is a few kilometres in length, for example about 2 km long. Its maximum length may be constrained by the availability of land at onshore fabrication facilities such as spoolbases, However, where the distance between subsea connection points requires a pipeline bundle to be longer, a bundle of the appropriate length can be fabricated from multiple bundle sections attached end-to-end. In principle, therefore, a bundle assembled from two or more such bundle sections could be of any length.

A common pipeline bundle configuration comprises at least one rigid flowline pipe to carry production fluids that comprise oil and/or gas, enclosed within a continuous rigid carrier pipe. The flowline pipe and the carrier pipe are typically of steel but either or both of them could be largely of composite material. Additional layers or components can be added to the pipes, such as an internal liner or an outer coating. Such additional layers or components can comprise polymer, metal or composite materials. Also, flowline pipes can be single-walled or of double-walled pipe-in-pipe (PiP) construction.

Other elongate elements such as pipes and cables are typically included in a pipeline bundle, extending in parallel with the flowline(s) to carry other fluids, power and data signals along the bundle. The bundle typically terminates in towhead structures at its ends. The towheads may include valves, connectors and manifolds to connect to a wellhead or to subsea jumper pipes.

Longitudinally-distributed transverse spacers hold the flowline(s) and other elongate elements within the carrier pipe and relative to each other. The spacers also facilitate insertion of the flowline(s) and other elongate elements into the carrier pipe during fabrication of the bundle.

Ends of the carrier pipe are closed by bulkheads to enclose a sealed hollow gas-filled chamber within the carrier pipe. In this way, the carrier pipe contributes buoyancy that enables the bundle to be towed to an installation site.

Integrating a pipeline bundle and towheads to form a towable unit allows a bundle system to be prefabricated, assembled and tested onshore or in sheltered water before it is towed to a subsea field for installation. Conveniently, therefore, multiple elongate elements can be towed together to an installation site as a single integral unit and installed on the seabed simultaneously in one operation. Reducing the number of subsea-connected interfaces simplifies the installation process and improves the reliability of the system, as compared with connecting units at a subsea location and performing tests there instead.

Traditional pipeline installation methods such as S-lay, J-lay or reel-lay can be used in deeper water but they cannot match the convenience and reliability of installing pipeline bundles because they cannot install several elongate elements on the seabed at one time.

By way of example, FIG. 1 shows a towable bundle unit 10 known in the prior art, comprising a pipeline bundle 12 connecting a leading towhead 14 and a trailing towhead 16. The bundle 12 is shown in FIG. 1 both interrupted and greatly shortened.

The towheads 14, 16 incorporate buoyancy, or provide for buoyancy to be attached, to offset their weight during towing. For example, buoyancy may be added directly to the towheads 14, 16 by attaching buoys or buoyancy modules to them.

The pipeline bundle 12 also contributes buoyancy to the unit 10 by virtue of air or other gas contained within its sealed carrier pipe. Additional external buoyancy may also be provided on, or attached to, the carrier pipe.

Various towing methods may be used to transport the unit 10 to an offshore installation site. In particular, the unit 10 may be towed at various depths in the water. The choice of towing depth involves a trade-off between different factors.

For example, the unit 10 may be surface-towed at or near to the surface 18, which is easiest to manage. However, surface water dynamics generate fatigue in the pipeline bundle 12, which is the limiting factor that determines the allowable tow distance. Conversely, towing near the seabed 20 protects the bundle 12 from the influence of surface water dynamics and limits risks during subsequent lowering to the seabed 20 at the installation site. However, controlling the unit 10 is more challenging at depth and is only feasible if the contours of the seabed 20 permit.

FIG. 1 shows the alternative of a mid-water towing method in which the unit 10 is towed at an intermediate depth in the water column between the surface 18 and the seabed 20. Here, the unit 10 is safely clear of the contours of the seabed 20 and is beneath significant influence from wave action near the surface 18. Specifically, FIG. 1 shows a favoured mid-water towing method known in the art as the 'controlled-depth tow method' or CDTM, as described in U.S. Pat. No. 4,363,566.

Mid-water towing is a good compromise that ensures low-stress installation without the use of large crane vessels that depend on low sea states. This makes installation less weather-sensitive and reduces the cost of installation vessels significantly. However, mid-water towing requires precise management of buoyancy.

In all towing methods, the unit 10 is held in tension by lines or chains 22 extending fore and aft from the respective towheads 14, 16 to respective installation vessels such as tugs 24. The bundle 12 acts in tension between the towheads 14, 16 during towing, with tensile loads being borne principally by the carrier pipe of the bundle 12.

The speeds of, and spacing between, the tugs 24 is adjusted to maintain the required depth having regard to the effect of drag forces and tension in the chains 22. Optionally, a third patrol/survey vessel 26 ahead of the leading tug 24 surveys the route and monitors the towing operation.

In the CDTM, the pipeline bundle 12 is made neutrally buoyant at the required depth by the addition of buoyancy and/or ballast chains spaced along its length. In the example shown, ballast chains 28 spaced along the bundle 12 add weight that offsets the buoyancy of the bundle 12. As a result of the added ballast weight, the bundle 12 hangs between the towheads 14, 16 as a catenary.

When the unit 10 reaches an installation site, the unit 10 is lowered toward the seabed 20 while the chains 22 are paid out from the tugs 24. The unit 10 can be lowered to the seabed 20 by removing external buoyancy from the unit 10 or by adding ballast to the unit 10.

The unit 10 settles on the seabed 20 in a predetermined gap in a subsea production system. For example, an upstream one of the towheads 14, 16 may be interposed between a wellhead and the bundle 12 and a downstream one of the towheads 14, 16 may be interposed between the bundle 12 and a riser.

When on the seabed 20 at the installation site, the unit 10 is connected via spool or jumper pipes at each towhead 14, 16 to other elements of the subsea production system using suitable well-known connectors. Those other elements may be placed on the seabed 20 before or after the unit 10. Spool or jumper pipes may connect the upstream one of the towheads 14, 16 to the wellhead and the downstream one of the towheads 14, 16 to the riser. However, the towheads 14, 16 could be connected to the wider subsea production system in other ways, for example via manifolds, and so need not be connected directly to the wellhead or to the riser.

Using known bundle technology in conjunction with the CDTM in deeper water poses particular challenges. Specifically, the wall of the carrier pipe has to be very thick to withstand the hydrostatic pressure in such water. Alternatively, or additionally, internal pressure in the carrier pipe has to be elevated during the fabrication process, which pressure must be maintained thereafter to counteract the expected hydrostatic pressure.

Increasing the wall thickness of an outer carrier pipe increases the weight of the bundle. Also, self-evidently, longer bundles tend to be heavier because, for a given configuration, weight increases with length. As a result, the overall weight of a bundle can exceed the bollard pull performance of even the most powerful available tug. In that event, multiple tugs must be used in parallel to tow the bundle, which generates additional hazards.

The conventional approach to reduce the apparent overall weight of a submerged towed elongate structure is to use an arrangement of buoys to add buoyancy to the structure. An example of attaching several discrete buoys along a submerged elongate structure is disclosed in U.S. Pat. No. 2,731,800, which describes towing of shore-fabricated pipe sections. However, the heavier the structure, the larger or more numerous and hence the more expensive the buoys. Also, larger or more numerous buoys are more challenging to release when landing the structure on the seabed.

NL 7805984 and NL 1012926 teach that successive buoys may be used inside a pipeline itself. This places the buoys inside a continuous, potentially very lengthy structure that is designed to resist collapse under hydrostatic pressure and is therefore thick-walled and intrinsically heavy. Yet, the internal dimensions of the pipeline constrain the size, hence the displacement and potential buoyant upthrust, of the buoys within. Also, removing such buoys from a pipeline after installation would be challenging. Similarly, CN 101648650 teaches the use of small airbag buoys inside a pipeline. However, in that case, the airbag buoys are a permanent part of the buoyancy tube. U.S. Pat. No. 3,756,034 teaches insertion of a string of articulated buoyancy chambers into a pipeline for support of the pipeline during a pipelaying operation.

Another way to add buoyancy to a structure such as a bundle is to use an additional buoyant carrier pipe, which may be attached to an outer carrier pipe of the bundle or directly to elongate elements of the bundle itself in the absence of an outer carrier pipe. It is possible for a carrier pipe to be filled with a buoyancy fluid such as gas or kerosene, as taught by GB 2377001. A drawback of this approach is the difficulty of safely flooding or uncoupling and retrieving the full length of the carrier pipe. This includes the challenges of managing the buoyancy fluid and the risk of environmental contamination if the buoyancy fluid leaks.

In GB 2377002, a carrier pipe is attached along its length to a pipeline and extends along and above the pipeline. The carrier pipe is filled with a buoyancy fluid and so serves as an elongate buoy that supports the pipeline. A drawback of this approach is that fine management of buoyancy fluid has to be achieved all along the length of the pipeline. In particular, a downline has to be used for fluid communication between the carrier pipe and the surface. A downline is a flexible hose or pipe that becomes difficult to handle in deeper water because it is susceptible to collapse under hydrostatic pressure.

In WO 2016/001680, a buoyancy pipe is attached to the bundle or as a core pipe and is filled with a buoyancy fluid. Ballasting for sinking the bundle is achieved by allowing seawater to enter the pipe in place of the buoyancy fluid. Here again, a downline may be required for fine management of buoyancy in practice.

GB 2408088 describes enclosing a towed pipeline inside a buoyant carrier pipe and then pulling the towed pipeline out of the carrier pipe for installation. This is not relevant to the present invention because such a carrier pipe would not be able to accommodate bundles, large-diameter pipelines or extremely long pipelines.

This invention provides an alternative to relying upon a closed carrier pipe for buoyancy. The invention negates the need for a closed carrier pipe and/or negates the need for external buoyancy modules. This allows pipeline bundles to be installed in deep and ultra deep water using the CDTM method.

Against this background, the invention provides a subsea structure that comprises: an elongate articulated buoyancy string comprising a longitudinal series of buoyancy elements; and at least one elongate buoyancy holder that is fixed relative to other parts of the subsea structure and is capable of housing the buoyancy string.

Preferably, the buoyancy holder is a discrete element, or is functionally and structurally distinct from the remainder of the subsea structure that requires support from the buoyancy string, or is dedicated to housing the buoyancy string, or is disposed outside the structure or other parts of the structure that perform the primary function of the structure.

At least one end of the buoyancy holder is preferably open, or openable, for ease of flooding and pressure equalisation. For the same purposes, a side wall of the buoyancy holder may be penetrated, perforated or interrupted by one or more lateral openings.

The buoyancy holder advantageously defines a transit path for movement of the buoyancy string along and within the buoyancy holder. Preferably the transit path extends from at least one end opening of the buoyancy holder, through which end opening the buoyancy string can pass on its withdrawal from the buoyancy holder or its insertion into the buoyancy holder.

The buoyancy holder is conveniently tubular, for example being defined by a thin-walled pipe that does not need to withstand hydrostatic pressure. A major portion of the tube may be substantially straight along a longitudinal axis while at least one minor end portion of the tube may be curved away from that longitudinal axis. For example, the minor end portion may be curved away from other elements of the structure, such as flowlines of a pipeline bundle structure along which the buoyancy holder extends.

The tubular buoyancy holder may be continuous along its length or may be divided longitudinally into segments, with a gap between neighbouring segments. The or each buoyancy holder, or segment thereof, is preferably longer than at least one buoyancy element of the buoyancy string.

A structure of the invention may have two or more of the elongate buoyancy holders, each being capable of housing a respective buoyancy string. In that case, the buoyancy holders of the plurality may be arranged end-to-end.

A buoyancy holder may be connected rigidly to the remainder of the subsea structure or integrated with the subsea structure.

The buoyancy elements may be are rigid, for example solid blocks, or may be hollow and filled with a buoyant fluid or a mass of buoyant spheres. The buoyancy elements may have a friction-reducing coating to ease their movement along the buoyancy holder.

Preferably, the buoyancy elements are each connected to the or each neighbouring buoyancy element in the series by a link that permits relative angular movement between neighbouring buoyancy elements. Such a link may comprise a flexible member or parts that are attached to each other by a pivotable joint.

The inventive concept extends to a corresponding method of altering the buoyancy of a subsea structure. That method comprises moving an elongate articulated buoyancy string of buoyancy elements along a transit path extending along and within an elongate buoyancy holder that is fixed relative to the structure. The transit path extends through an end opening of the buoyancy holder. The buoyancy string passes through that end opening.

When applied to reducing the buoyancy of the subsea structure, the method suitably comprises withdrawing the buoyancy string from within the buoyancy holder through the end opening. Conversely, when applied to increasing the buoyancy of the subsea structure, the method suitably comprises inserting the buoyancy string into the buoyancy holder through the end opening.

The buoyancy string may be pulled through the end opening by applying tension to one end of the buoyancy string. Back-tension may be applied to the buoyancy string by applying tension to an opposite end of the buoyancy string. Conveniently, tension and back-tension may be applied to respective ends of the buoyancy string by a single surface support vessel, although different surface support vessels may be used for those respective purposes instead.

Tension may be applied to an end of the buoyancy string by pulling a tensile element such as a wire or rope that extends along the buoyancy holder. For example, the tensile element may extend along a full length of the buoyancy holder and through opposed end openings of the buoyancy holder.

The buoyancy string may be bent along its length. For example, the buoyancy string may be bent as it follows a curved transit path within the buoyancy holder. It is also possible for the buoyancy string to be bent when outside the buoyancy holder, between the end opening and the sea surface.

In summary, a subsea structure of the invention has at least one elongate buoyancy holder that can house an elongate articulated buoyancy string comprising a longitudinal series of buoyancy elements. In a method of the invention, the buoyancy of the structure may be altered by moving the buoyancy string along a transit path that extends along and within the buoyancy holder and through an end opening of the buoyancy holder. The buoyancy string passes through that end opening on being inserted into or withdrawn from the buoyancy holder.

Embodiments of the invention involve the use of a core pipe that extends like a hollow spinal column along the entire length of a pipeline bundle. The core pipe has openings to allow water to enter the pipe and hence to equalise hydrostatic pressure between the inside and the outside of the pipe. For example, the core pipe may be perforated along its length. However, the core pipe can contribute strength to the entire bundle structure to which it is attached, even though it does not need to withstand hydrostatic pressure.

The primary purpose of the core pipe is to provide a holding structure or housing that holds removable buoyancy modules. The core pipe has specially-fabricated entry and exit points, allowing for modular buoyancy to be installed into and retrieved from the core pipe. A series of buoyancy modules are thereby installed into the core pipe to provide buoyancy for the entire bundle.

Interconnecting the buoyancy modules allows them to be retrieved in a single operation after the bundle structure arrives at its installation site, simply by pulling the string of interconnected buoyancy modules out of the core pipe. The spacing between and dimensions of the buoyancy modules can be adapted to suit the particular buoyant uplift requirement for a given bundle design.

The design of the core pipe, the interconnected buoyancy modules and the entry/exit points also allows for buoyancy to be reinserted into the core pipe. This allows the bundle to be re-floated and removed from its location for decommissioning or for re-installation at a new location.

Consequently, the invention improves the concept of a buoyancy pipe in that the pipe itself is not used to define a buoyancy chamber but instead is used as a frame or guide for holding removable buoyancy. The buoyancy pipe is therefore an open-ended pipe that can also have lateral holes for quicker flooding and hence ballasting by seawater.

The removable buoyancy comprises several small, discrete buoys or other positively-buoyant elements connected by a pulling line. Those elements can fit into the buoyancy pipe, preferably in longitudinal series within the buoyancy pipe. The buoyancy pipe defines a longitudinally-extending channel for holding the elements in longitudinal series and for guiding insertion or withdrawal movement of the string along the pipe.

The removable buoyancy is suitably installed into the buoyancy pipe onshore. When the structure supported by the buoyancy pipe reaches its destination, the removable buoyancy may be pulled out of the buoyancy pipe. It is possible to reuse or reinsert the removable buoyancy into the buoyancy pipe for recovery of the structure.

Another advantage of the invention is that it obviates management of buoyancy fluid. Buoyancy fluid may be enclosed or encapsulated inside the smaller buoys, or the buoys could comprise solid buoyancy blocks of syntactic foam.

Thus, embodiments of the invention provide a floatation device for installation and removal of subsea equipment such as a pipeline bundle, the floatation device comprising: an elongated buoyancy support tube mechanically coupled to the subsea equipment; and removable buoyancy equipment comprising a plurality of buoys connected by articulated links; wherein the removable buoyancy equipment can fit removably inside the buoyancy support tube.

The elongated buoyancy support tube may have at least one lateral hole. The lateral holes may be hidden or closed by an external wall of the removable buoyancy equipment.

The removable buoyancy equipment may comprise buoyancy tanks and/or solid buoys, and may be coated with a low-friction material such as PTFE. Any shape suitable for insertion and removal into the elongated buoyancy support tube is acceptable.

Each articulated link may allow at least two rotational degrees of freedom between its ends. For example, the articulated links may be flexible and may be of metallic or synthetic rope, wire or chain. Metallic cable is preferred because it is flexible, though less elastic than rope, and is resistant to high tension.

The elongated buoyancy support tube may be attached to or integral with the subsea equipment.

Embodiments of the invention perform a method to provide buoyancy to subsea equipment, the method comprising: mechanically coupling an elongated buoyancy support tube to the subsea equipment; inserting removable buoyancy equipment into the elongated buoyancy support tube when its buoyancy is required; and removing the removable buoyancy equipment from the tube when its buoyancy is no longer required. Conveniently, the removable buoyancy equipment may be inserted into the tube by pulling it into the tube and may be removed from the tube by pulling it out of the tube.

Reference has already been made to FIG. 1 of the accompanying drawings, which is a side view of a pipeline bundle unit being towed to a subsea installation site using the controlled depth tow method known in the prior art. In order that the invention may be more readily understood, reference will now be made, by way of example, to the remainder of the drawings in which:

FIG. 2 is a side view of a pipeline bundle unit in accordance with the invention;

FIG. 3 is an enlarged detail perspective view of part of the pipeline bundle unit of FIG. 2;

FIG. 4 is a further enlarged detail side view of a buoyancy tube of the pipeline bundle unit of FIG. 2, shown in longitudinal section;

FIG. 5 is an enlarged detail side view of the pipeline bundle unit of FIG. 2, shown in longitudinal section, with the buoyancy tube containing a series of interconnected buoyancy elements defining a buoyancy string;

FIG. 6 is an enlarged cross-sectional view of the pipeline bundle unit taken on line VI-VI of FIG. 5;

Figure 7:
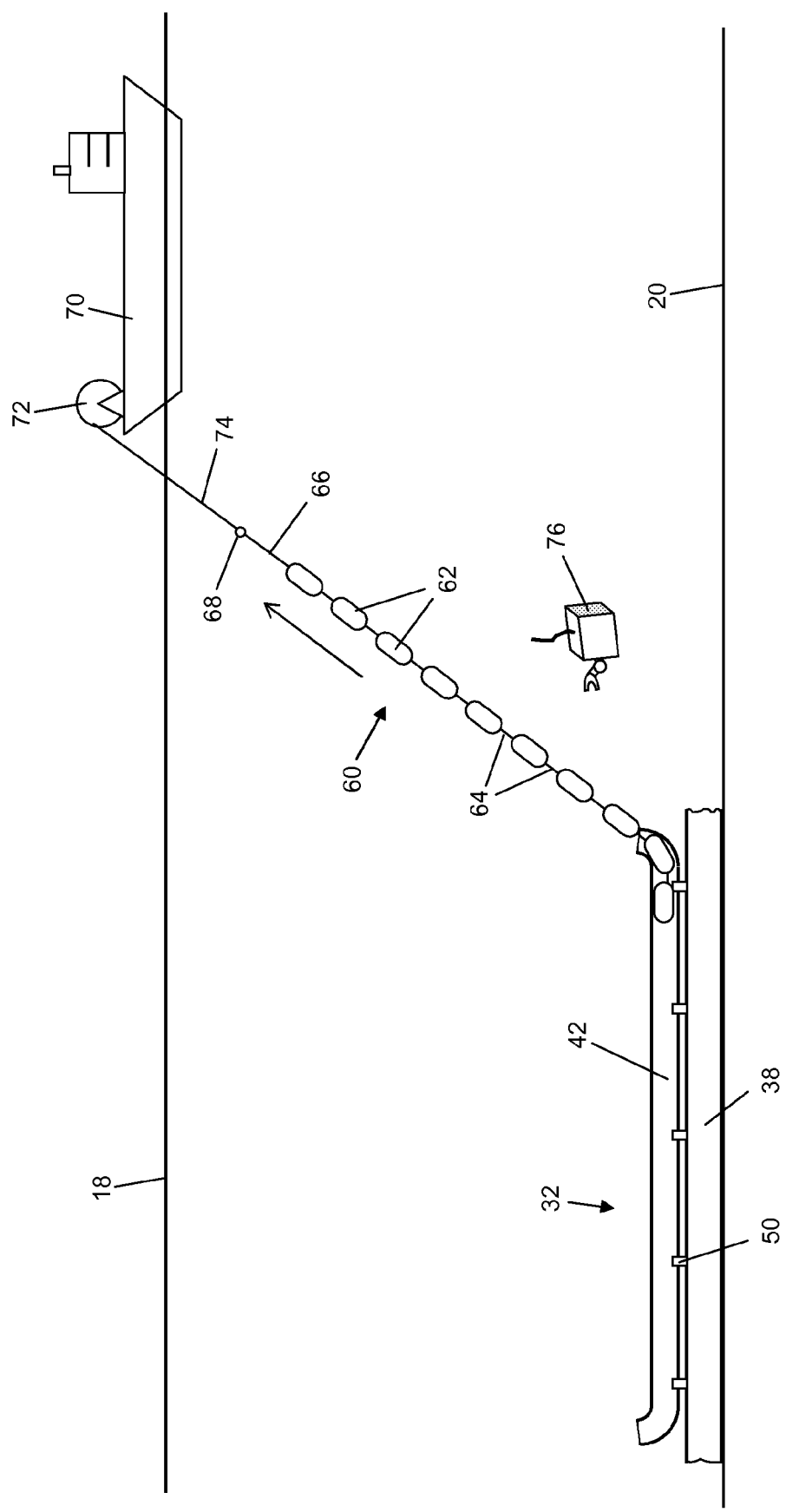
FIG. 7 is a schematic side view of a withdrawal operation in which a buoyancy string is being withdrawn from a buoyancy tube of a pipeline bundle.

Turning next, then, to FIGS. 2 to 6 of the drawings, FIG. 2 shows a pipeline bundle unit 30 of the invention and FIGS. 3 to 6 show details of a pipeline bundle 32 at the heart of the unit 30.

FIG. 2 shows the elongate bundle 32 in context within the pipeline bundle unit 30, extending between a leading towhead 34 and a trailing towhead 36 like the bundle 12 of the unit 10 shown in FIG. 1. The unit 30 is similarly apt to be towed for installation using the CDTM as described above with reference to FIG. 1. However by virtue of the invention, the unit 30 can be towed and installed in deeper water than can be achieved in the prior art.

As best appreciated in the perspective view of FIG. 3 and the cross-sectional view of FIG. 6, the bundle 32 of this example comprises a group of three substantially straight flowlines 38. The flowlines 38 extend parallel to each other and parallel to a central longitudinal plane 40 of the bundle 32 as shown in FIG. 6, which plane passes through the centre of a central one of the flowlines 38 of the group. In this example, the bundle 32 is not enclosed within a conventional external carrier pipe although it would be possible to add such a carrier pipe.

During installation, the flowlines 38 generally contain air. In service, after connection to the oil field, the flowlines 38 contain pressurised fluid such as crude oil flowing from a production well. Thus, each flowline 38 will typically be a substantially rigid pipe of steel or composite material, whose wall is strong enough to resist hydrostatic pressure expected at a subsea installation site.

Whilst rigid and nominally straight, the pipes of the flowlines 38 can bend elastically along their length during towing as exemplified by FIG. 1. This is consistent with the skilled person's understanding of 'rigid' in the context of subsea pipes and is to be distinguished from the skilled person's understanding of 'flexible' in that same context.

A longitudinal series of buoyancy tubes 42 also extends along the bundle 32, the buoyancy tubes 42 being disposed generally end-to-end with respect to each other. The buoyancy tubes 42 and the flowlines 38 are disposed symmetrically about the central longitudinal plane 40. Thus, the buoyancy tubes 42 all lie on the central longitudinal plane 40 above the group of flowlines 38. If the bundle 32 is enclosed within a single carrier pipe, as is optional but is not shown, at least one elongated buoyancy tube 42 can be mounted along that carrier pipe.

A major central portion 44 of each buoyancy tube 42 is substantially straight and generally parallel to the flowlines 38. Conversely, minor end portions 46 of each buoyancy tube 42 curve upwardly away from the group of flowlines 38, in this example by 90 degrees to the longitudinal axis of the major central portion 44. The end portions 46 define entry and exit openings 48 of the buoyancy tube 42 that communicate with the major central portion 44.

Longitudinally-spaced frames 50 connect each of the flowlines 38 directly to the buoyancy tubes 42, and indirectly via the buoyancy tubes 42 to each other. The cross-sectional view of FIG. 5 shows that each frame 50 comprises arms 52 that radiate with angular spacing from a buoyancy tube 42 to the respective flowlines 38. The arms 52 provide convenient mountings for other parts of the bundle 32 including control unit tubing 54 and other elongate elements 56, such as power and data highway cables or service fluid lines.

The buoyancy tubes 42 are penetrated by one or more lateral openings 58 that promote flooding of the buoyancy tubes 42 and hence enable pressure equalisation. A buoyancy tube 42 may therefore have a substantially thinner wall than a flowline 38 as it does not need to withstand hydrostatic pressure at depth. In this example, as best shown in the longitudinal sectional view of FIG. 4, the tubular wall of the buoyancy tube 42 is perforated with an array of many such openings 58 to ensure quick flooding and continuous equalisation of hydrostatic pressure.

As best appreciated in FIG. 5, each buoyancy tube 42 is capable of accommodating a respective buoyancy string 60 that can slide within the buoyancy tube 42 in telescopic fashion. The buoyancy string 60 comprises a plurality of interlinked buoyancy modules or elements 62 spaced end-to-end in longitudinal series like the links of a chain or the carriages of a train. Thus, the buoyancy string 60 is articulated and has flexibility to bend along its length, although the individual buoyancy elements 62 and the connections between them need not necessarily be flexible themselves.

Links 64 between adjacent buoyancy elements 62 allow relative angular movement between those buoyancy elements 62. Each link 64 may, for example, be a flexible link such as a rope of polymer or steel. The links 64 also transmit axial tensile loads between the adjacent buoyancy elements 62, which loads are transmitted along the buoyancy string 60 through the succession of buoyancy elements 62.

At least one end of each buoyancy string 60 terminates in a wire or rope 66 having a buoyant coupling formation 68 such as a 'monkey-fist' at its free end. When the buoyancy string 60 is fully inserted into the buoyancy tube 42, the coupling formations 68 at the ends of the buoyancy string 60 float freely outside the respective entry and exit openings 48 of the buoyancy tube 42. The coupling formations 68 may then be grasped conveniently by an ROV to be coupled to a wire for withdrawing the buoyancy string 60, as will be explained with reference to later drawings.

Each buoyancy element 62 of the buoyancy string 60 preferably comprises a solid block of positively-buoyant material such as a syntactic foam. Such a block may be coated in a protective polymer layer and may also be coated with a surface layer of a low-friction material such as PTFE. The block also has rounded edges and smooth surfaces. The interior of the buoyancy tube 42 is similarly smooth and may also be coated in a low-friction material such as PTFE.

These various friction-reducing provisions ensure smooth movement of the buoyancy string 60 along the buoyancy tube 42 during insertion and withdrawal, without overstressing the buoyancy string 60 due to blockages or jams. It will also be noted that the numerous lateral openings 58 allow water to flow readily into and out of the buoyancy tube 42 under the piston effect of a buoyancy string 60 moving along the buoyancy tube 42 during withdrawal and insertion. This also reduces resistance to motion of the buoyancy string 60 along the buoyancy tube 42.

Figure 8:
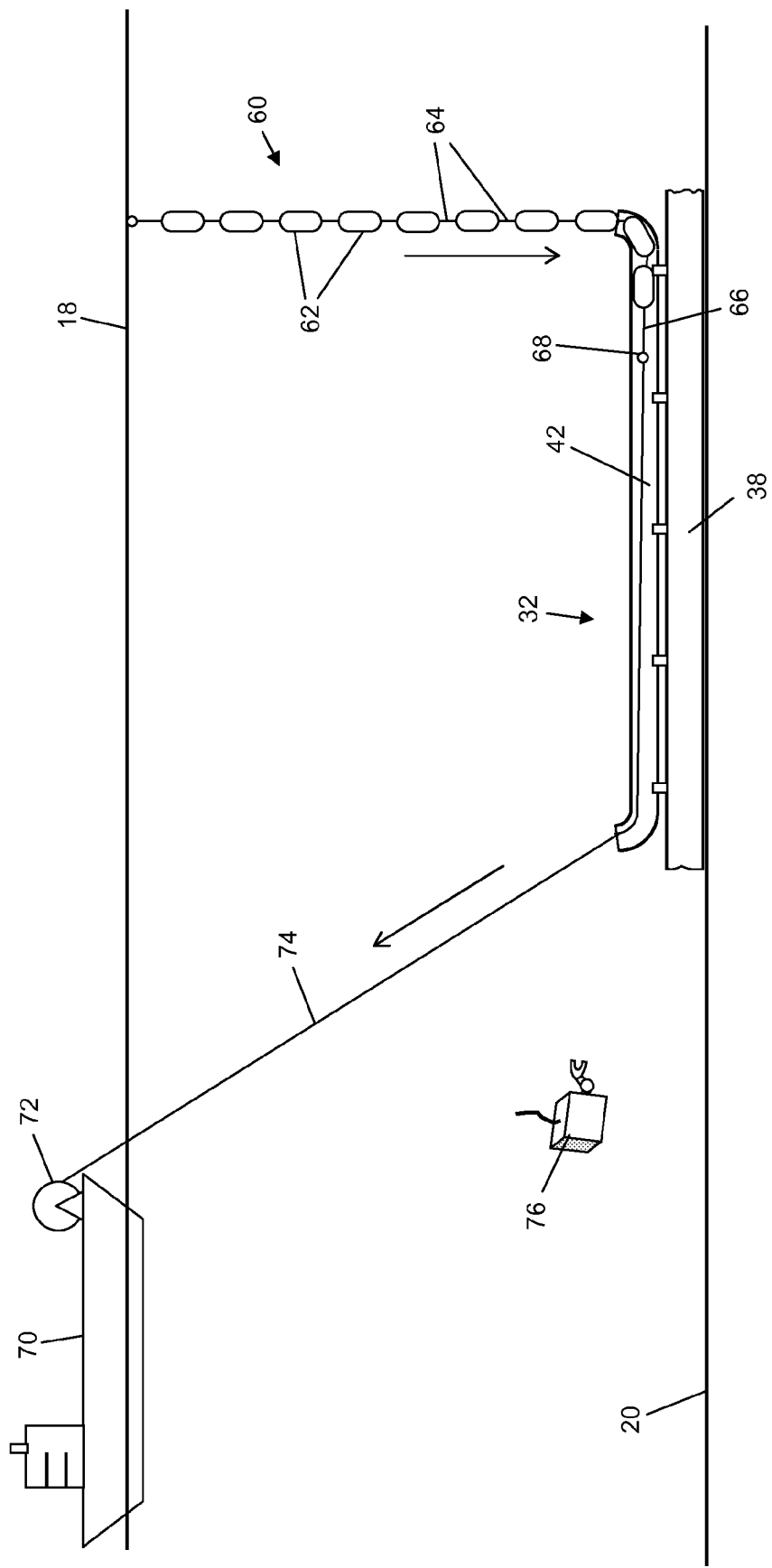
FIG. 8 is a schematic side view of an insertion operation in which a buoyancy string is being inserted into a buoyancy tube of a pipeline bundle.
Figure 9:
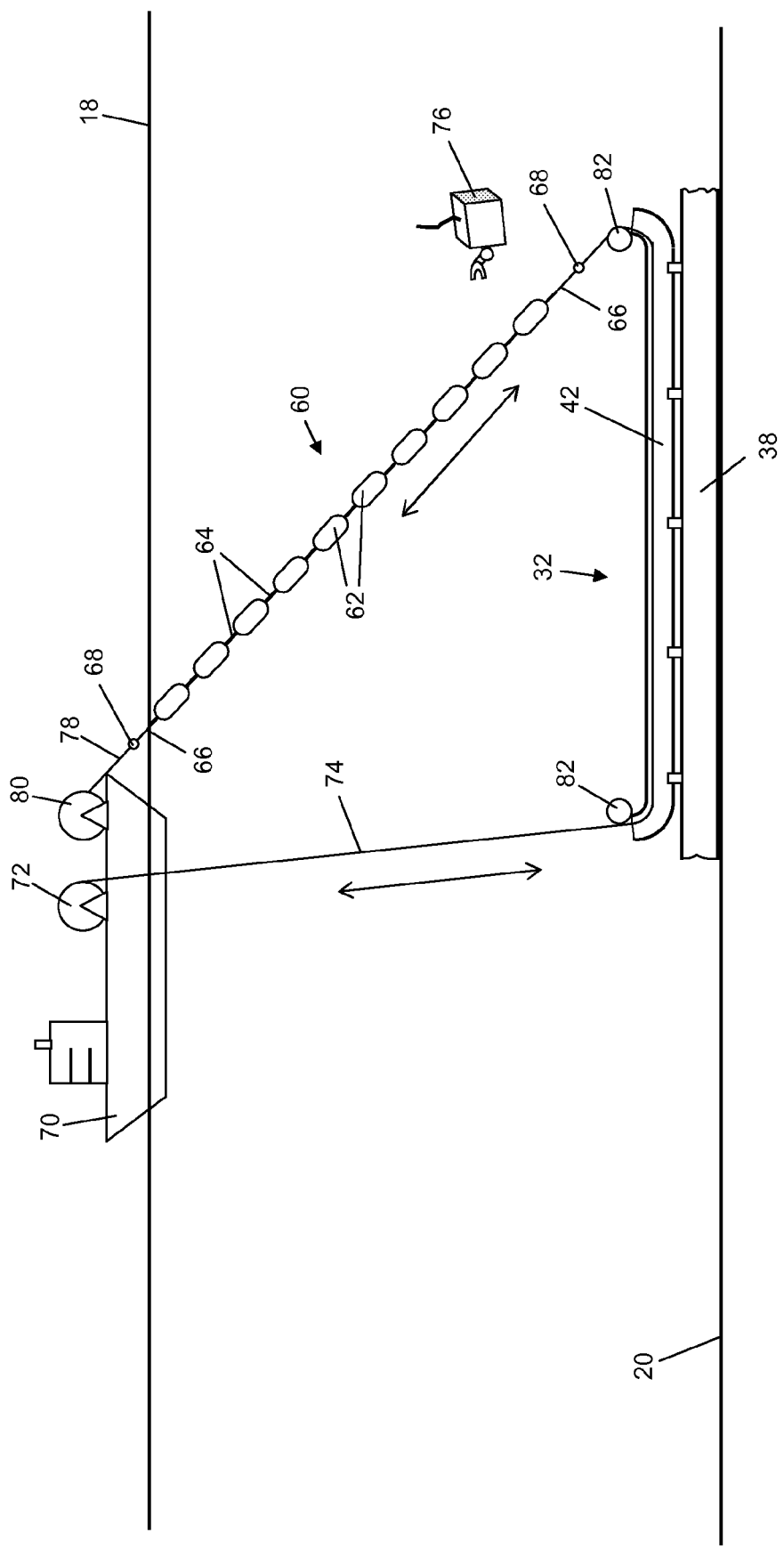
FIG. 9 is a schematic side view of a withdrawal or insertion operation in which a buoyancy string is being withdrawn from or inserted into a buoyancy tube of a pipeline bundle.

FIGS. 7 to 9 show various ways in which a buoyancy string 60 may be removed or withdrawn from, and inserted into, a buoyancy tube 42 of a pipeline bundle 32 landed on the seabed 20 in accordance with the invention. These are simplified views that do not reflect the likely curvature of the buoyancy string 60 under its self-buoyancy when it is out of the confines of the buoyancy tube 42.

FIG. 7 shows a withdrawal operation, as may be performed when ballasting the bundle 32 to settle the bundle onto the seabed 20 during subsea installation. In this example, a support vessel 70 floating on the surface 18 has a winch 72 that pulls on a wire 74. The wire 74 extends down to a rope 66 at an end of the buoyancy string 60, which rope 66 protrudes from one end of the buoyancy tube 42. The coupling formation 68 at the end of the rope 66 has been grasped by a UUV such as an ROV 76, which has then connected the rope 66 to the wire 74. Divers could perform that connection operation instead of an ROV 76 if the water is shallow enough for divers to operate.

The buoyancy string 60 is shown in FIG. 7 having been pulled partially out of the buoyancy tube 42 by tension applied through the wire 74. Also, the vessel 70 is shown in FIG. 7 displaced on the surface 18 longitudinally with respect to the pipeline bundle unit 30 on the seabed 20. This allows space for the buoyancy string 60 to breach the surface 18 without hitting the vessel 70, bearing in mind that when it has been withdrawn sufficiently from the buoyancy tube 42, the buoyancy string 60 will rise quickly to the surface 18 under its own buoyancy.

If the buoyancy string 60 is long enough and the water is shallow enough, it would be possible for the ascent of the buoyancy string 60 to the surface 18 to be controlled by frictional engagement with the buoyancy tube 42. Specifically, control may be applied by virtue of an end portion of the buoyancy string 60 remaining frictionally engaged within the buoyancy tube 42 while the other end of the buoyancy string 60 reaches the surface 18. The vessel 70 can then pull the end portion of the buoyancy string 60 out of frictional engagement with the buoyancy tube 42 so that the remainder of the buoyancy string 60 can rise to the surface 18.

FIG. 8 shows an insertion operation, as may be performed when refloating the bundle 32 for relocation or decommissioning. In this example, a support vessel 70 floating on the surface 18 has a winch 72 that pulls on a wire 74 extending down to one end of the buoyancy tube 42. The wire 74 extends through the opening 48 at that end and along the buoyancy tube 42 to emerge from the opening 48 at the other end of the buoyancy tube 42. The wire 74 then extends upwardly to be connected via a rope 66 and a coupling formation 68 to a buoyancy string 60. The buoyancy string 60 is shown here being pulled down from the surface 18 under tension applied through the wire 74 and now partially inserted into the buoyancy tube 42. Eventually the buoyancy string 60 will be inserted fully within the buoyancy tube 42, whereupon an ROV 76 can disconnect the wire 74 from the rope 66 at an end of the buoyancy string 60.

FIG. 9 shows an arrangement that can be used for both withdrawal and insertion of a buoyancy string 60 from and into a buoyancy tube 42. In this arrangement, the buoyancy string 60 is tensioned between two wires, one being a first wire 74 tensioned by a first winch 72 and the other being a second wire 78 tensioned by a second winch 80. The buoyancy string 60 may have ropes 66 and coupling formations 68 at both ends to be connected by an ROV 76 to the respective wires 74, 78.

The wires 74, 78 and the winches 72, 80 operate in coordination to control the buoyancy string 60 and to apply back-tension to it. In this way, the buoyancy string 60 remains under control at all times when moving in either direction between the surface 18 and the buoyancy tube 42.

In the example shown in FIG. 9, both winches 72, 80 are supported by the same support vessel 70. However, it would be possible instead for two support vessels 70 to work in coordination, each having a respective one of the winches 72, 80. In effect, the result of using two support vessels 70 would be a combination of the arrangements shown in FIGS. 7 and 8.

The wire 74 extends down from the winch 72 to a sheave 82 at one end of the buoyancy tube 42. The wire 74 extends through the opening 48 at that end and along the buoyancy tube 42 to emerge from the opening 48 at the other end of the buoyancy tube 42, where it runs around another sheave 82. The wire 74 then extends upwardly to a buoyancy string 60, shown here under tension between downward force applied through the wire 74 and upward force applied by the winch 80 through the wire 78.

When the winch 72 pulls in the wire 74 and the winch 80 simultaneously pays out the wire 78, the wires 74, 78 and the buoyancy string 60 tensioned between the wires 74, 78 move clockwise relative to the buoyancy tube 42 as drawn. This movement inserts the buoyancy string 60 into the buoyancy tube 42. Of course, it would also be possible to insert the buoyancy string 60 from the other end of the buoyancy tube 42 by running the system in reverse, in an anticlockwise sense as drawn.

When the buoyancy string 60 has been inserted fully into the buoyancy tube 42, an ROV 76 can disconnect the wires 74, 78 from the ropes 66 at the ends of the buoyancy string 60.

It would also be possible to use the arrangement shown in FIG. 9 to withdraw the buoyancy string 60 from either end of the buoyancy tube 42. First, the wires 74, 78 are connected to the ropes 66 at the ends of the buoyancy string 60 protruding from the buoyancy tube 42. Next, the system is run in either direction, either by pulling in the wire 74 while paying out the wire 78 or by pulling in the wire 78 while paying out the wire 74.

Variations are possible within the inventive concept. For example, some pipeline bundles could have fewer flowlines or more flowlines than in the embodiments shown.

There could be just one buoyancy tube extending along substantially the full length of the bundle. This would help the buoyancy tube to contribute to bearing tensile stress in the bundle. Alternatively there could be more, shorter buoyancy tubes extending along the bundle. Correspondingly shorter buoyancy strings may be easier to manage during withdrawal and insertion than one longer string whose length is similar to their aggregate length.

Figure 10:
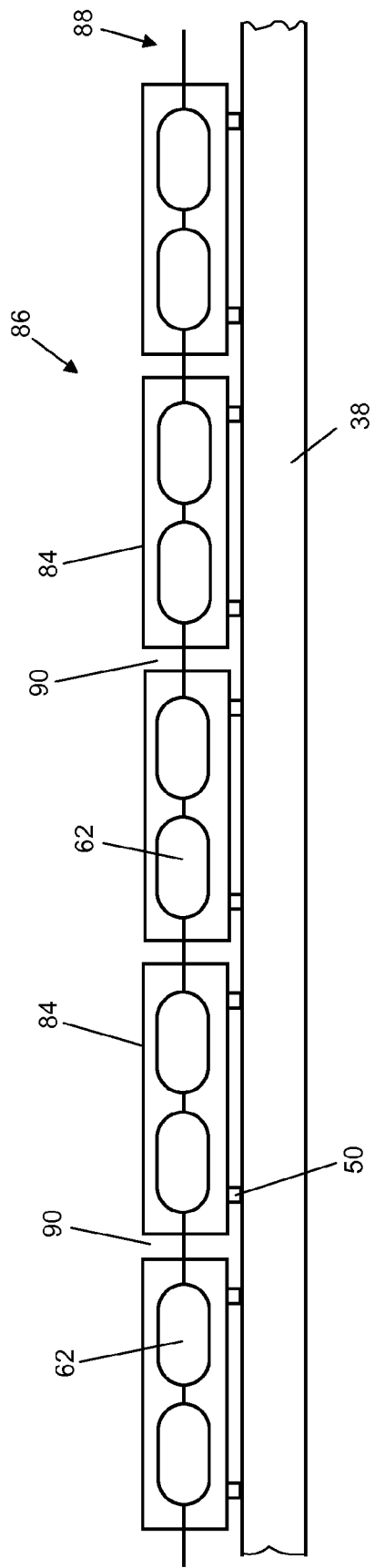
FIG. 10 is a schematic side view of a pipeline bundle in a further variant of the invention.

FIG. 10 illustrates another possibility, having an end-to-end series of very short buoyancy tubes 84 spaced in longitudinal alignment along a flowline 38 of a bundle 86. Each individual buoyancy tube 84 is longer than at least one of the buoyancy elements 62. In this example, each of the buoyancy tubes 84 is long enough to accommodate only a few buoyancy elements 62, in this example just two buoyancy elements 62 per buoyancy tube 84. However, all of the buoyancy elements 62 of the combined buoyancy tubes 84 are interlinked into a single buoyancy string 88. The spacing of the buoyancy elements 62 varies along the buoyancy string 88, the buoyancy elements 62 being grouped in pairs in accordance with the relative positons of the successive buoyancy tubes 84.

In effect, therefore, the multiple buoyancy tubes 84 in FIG. 10 combine to form a single interrupted buoyancy tube, that tube being interrupted where the mutual longitudinal spacing between neighbouring buoyancy tubes defines transverse gaps 90. Each of those gaps 90 is narrower than the length of a buoyancy element 62 so that the buoyancy elements 62 remain confined within the row of buoyancy tubes 84. The gaps 90 facilitate effective flooding of the buoyancy tubes 84 without having to perforate the walls of those tubes 84 with multiple openings as in a preceding embodiment.

Many other variations are possible. For example, where present, minor end portions of each buoyancy tube may be flared and may turn away from the longitudinal axis by less than 90 degrees. Flared end portions of a buoyancy tube may even be aligned with the longitudinal axis.

Shorter buoyancy tubes may dispense with lateral openings for pressure equalisation, instead relying upon openings at the ends of the buoyancy tube to allow flooding with seawater.

A buoyancy tube preferably has two opposed ends that are open, or openable, to act as entry or exit openings for a buoyancy string. However it would be possible for only one of the ends of a buoyancy tube to be open, or openable. In that case, a buoyancy string may only be inserted into the buoyancy tube, or withdrawn from the buoyancy tube, through that one end.

The buoyancy elements could instead contain a positively-buoyant liquid such as kerosene encapsulated within a rigid or flexible shell, or a gas, or a mass of buoyant hollow macrospheres.

When a buoyancy string has been inserted into a buoyancy tube, the openings at the ends of the buoyancy tube could be capped with lids or membranes that block the entry of marine sediment. Such sediment could otherwise interfere with withdrawal of the buoyancy string from the buoyancy tube. Such lids or membranes could nevertheless have equalisation openings to allow water to flow through them into the buoyancy tube. Such lids or membranes could be removable or breakable on withdrawal of the buoyancy string from the buoyancy tube.

The links between adjacent buoyancy elements of a buoyancy string could instead be articulated links comprising cooperating rigid parts connected by pivot or hinge formations. The links could be separable so that buoyancy elements can be added to or removed from a buoyancy string.

The links between adjacent buoyancy elements of a buoyancy string could be part of a continuous tensile member that extends through the buoyancy elements. For example, a rope defining flexible links could extend through the buoyancy elements along the length of the buoyancy string.

The buoyancy tubes could be replaced by buoyancy holders or buoyancy housings having various other shapes or configurations. In particular, various cross-sectional shapes are possible provided that the holders or housings retain the interlinked buoyancy elements in the bundle and define a transit path serving as an insertion and/or withdrawal path for those buoyancy elements.

Winches are apt to pull the buoyancy string out of or into the buoyancy tubes. The examples described above employ winches aboard surface vessels. However, underwater winches could be used. For example, an underwater winch located on the seabed at some distance from the bundle can be connected to the buoyancy string, and be controlled remotely from the surface, or by an ROV, or by a diver.

The invention has particular benefits for controlling the buoyancy of elongate towable structures such as pipeline bundles. However, the invention could be used to control the buoyancy of other large submerged structures when towing them at any depth, when lowering them to the seabed and when raising them from the seabed.

The invention claimed is:

1. A combination of:
a subsea structure, being a pipeline bundle;
an elongate articulated buoyancy string comprising a longitudinal series of buoyancy elements; and
at least one elongate tubular buoyancy holder that is capable of housing the buoyancy string, the buoyancy holder being fixed relative to, and extending along, the pipeline bundle, wherein the buoyancy holder defines a transit path for movement of the buoyancy string along and within the buoyancy holder; and
wherein a side wall of the buoyancy holder is penetrated by one or more lateral openings.

2. The combination of claim 1, wherein the transit path extends from at least one end opening of the buoyancy holder, through which end opening the buoyancy string can pass on withdrawal from the buoyancy holder or insertion into the buoyancy holder.

3. The combination of claim 1, wherein a major portion of the tubular buoyancy holder is substantially straight along a longitudinal axis and at least one minor end portion of the tubular buoyancy holder is curved away from the longitudinal axis.

4. The combination of claim 3, wherein the minor end portion of the tubular buoyancy holder is curved away from other elements of the pipeline bundle.

5. The combination of claim 1, wherein the tubular buoyancy holder is continuous along its length.

6. The combination of claim 1, wherein the tubular buoyancy holder is divided longitudinally into segments with a gap between neighbouring segments.

7. The combination of claim 1, comprising a plurality of said buoyancy holders.

8. The combination of claim 7, wherein the buoyancy holders of the plurality are arranged end-to-end.

9. The combination of claim 1, wherein the or each buoyancy holder is connected rigidly to the remainder of the pipeline bundle.

10. The combination of claim 1, wherein the or each buoyancy holder is integrated with the pipeline bundle.

11. The combination of claim 1, wherein the or each buoyancy holder is longer than at least one buoyancy element of the buoyancy string.

12. The combination of claim 1, wherein the buoyancy elements are rigid.

13. The combination of claim 1, wherein the buoyancy elements are solid blocks.

14. The combination of claim 1, wherein the buoyancy elements are hollow and are filled with a buoyant fluid or a mass of buoyant spheres.

15. The combination of claim 1, wherein the buoyancy elements have a friction-reducing coating.

16. The combination of claim 1, wherein the buoyancy elements are each connected to the or each neighbouring buoyancy element in the series by a link that permits relative angular movement between neighbouring buoyancy elements.

17. The combination of claim 16, wherein the link is a flexible member.

18. The combination of claim 16, wherein the link comprises parts attached by a pivotable joint.

19. A method of altering the buoyancy of a subsea structure being a pipeline bundle, the method comprising:

moving an elongate articulated buoyancy string of buoyancy elements along a transit path extending along and within an elongate tubular buoyancy holder that extends along and is fixed relative to the pipeline bundle, wherein the transit path extends through an end opening of the buoyancy holder and the buoyancy string passes through that end opening; and flooding and equalising pressure in the buoyancy holder through one or more lateral openings that penetrate a side wall of the buoyancy holder.

20. The method of claim 19 when applied to reducing the buoyancy of the pipeline bundle, the method comprising withdrawing the buoyancy string from within the buoyancy holder through the end opening.

21. The method of claim 19 when applied to increasing the buoyancy of the pipeline bundle, the method comprising inserting the buoyancy string into the buoyancy holder through the end opening.

22. The method of claim 19, comprising pulling the buoyancy string through the end opening by applying tension to one end of the buoyancy string.

23. The method of claim 22, further comprising applying back-tension to the buoyancy string by applying tension to an opposite end of the buoyancy string.

24. The method of claim 23, wherein tension and back-tension are applied to respective ends of the buoyancy string by a single surface support vessel.

25. The method of claim 22, comprising applying tension to an end of the buoyancy string by pulling a tensile element that extends along the buoyancy holder.

26. The method of claim 25, wherein the tensile element extends along a full length of the buoyancy holder and through opposed end openings of the buoyancy holder.

27. The method of claim 19, comprising bending the buoyancy string along its length.

28. The method of claim 27, comprising bending the buoyancy string as the buoyancy string follows a curved transit path within the buoyancy holder.

29. The method of claim 27, comprising bending the buoyancy string outside the buoyancy holder between the end opening and the sea surface.

* * * * *